July 20, 1954 M. G. CROSBY 2,684,438
RELAY FEEDBACK SYSTEM
Filed Aug. 15, 1950
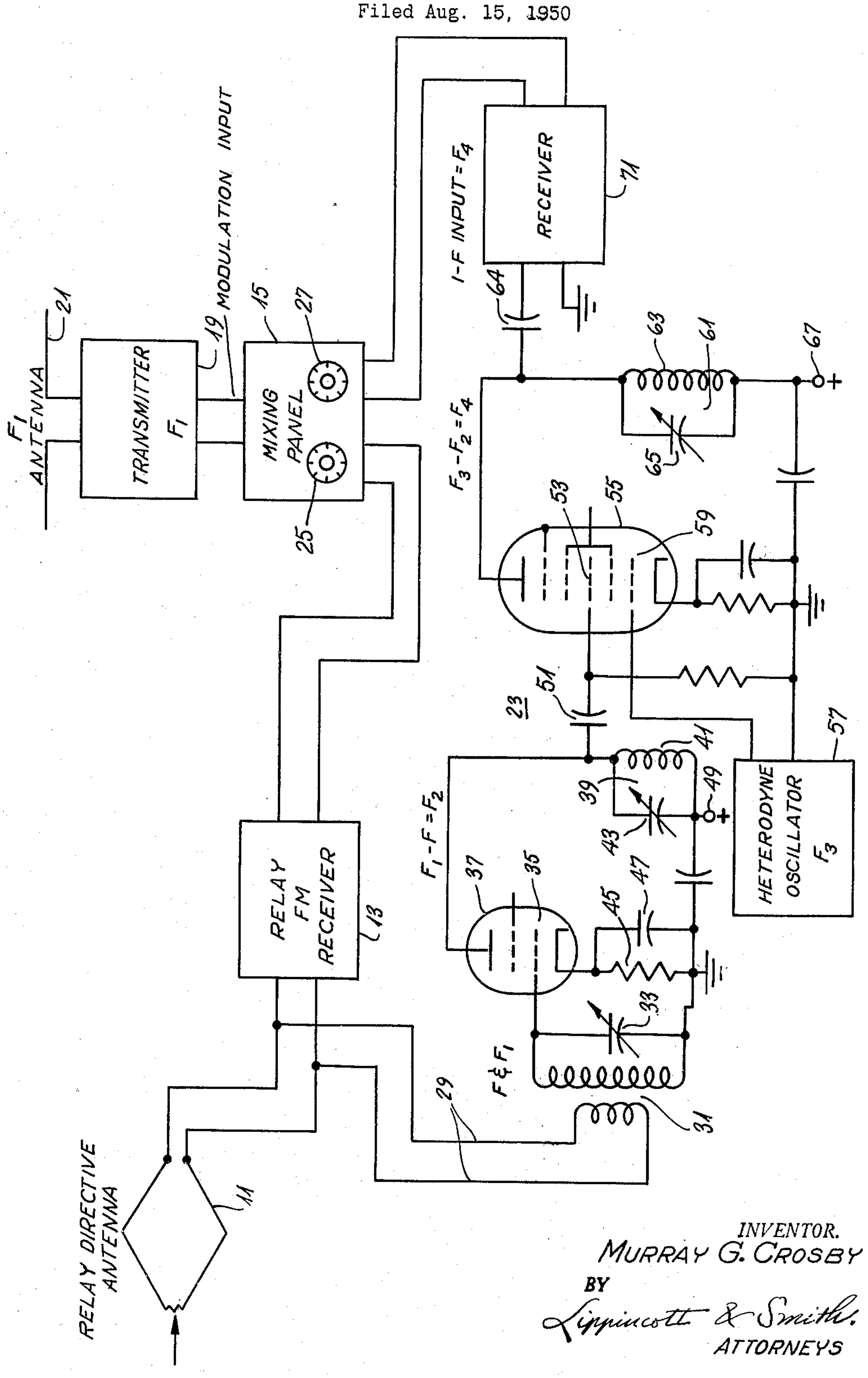
INVENTOR.
MURRAY G. CROSBY
BY
Lippincott & Smith.
ATTORNEYS Patented July 20, 1954

2,684,438

UNITED STATES PATENT OFFICE 2,684,438

RELAY FEEDBACK SYSTEM

Murray G. Crosby, Mineola, N. Y.

Application August 15, 1950, Serial No. 179,509

5 Claims. (Cl. 250—15)

This invention relates to radio relays. It is particularly concerned with a radio relay station for receiving and retransmitting frequency-modulated signals in a substantially distortion-free manner.

The prior art has disclosed certain methods and means for relaying frequency-modulated signals. In general two methods for providing such types of repeater operations have heretofore been used. One of these methods may be practiced by receiving the signal to be relayed and wholly converting that signal to an audio frequency modulation to be used to modulate the input of a frequency-modulation transmitter. This frequency modulation transmitter operates at a frequency which is slightly different from that carrier frequency on which the signal is received initially for relaying purposes. The received signals for relaying are derived from the usual form of directive antenna. Likewise, the retransmitted signals are radiated, preferably from a directive antenna in a manner now known in the art.

The second method of frequency modulation relay operation heretofore practiced involves the reception of the signal modulation from a remote point occurring on one carrier frequency and the conversion thereof to a new radiation frequency. In the process of conversion desired signal amplification has been brought about prior to re-radiation. This latter system involves generally only two main steps, one being conversion and the other being amplification. As a result the wave remains as a frequency-modulated radio frequency wave, thus relatively unsusceptible to distortion effects customarily resulting from nonlinear devices. A system of this latter character therefore offers in relay repeater action generally a minimum of introduced distortion.

Those systems which employ the first-mentioned form of relaying wherein detection and signal remodulation is utilized are subject to the introduction of distortion, which, in such a type of operation, may become additive. Such nonlinearities as exist in any of the frequency-modulation detectors, the audio frequency circuits and the modulator of the frequency modulation transmitter may combine to produce an additive distortion. The result is that the relayed signal becomes distorted with respect to the signal received for relaying. Where a plurality of stages are provided for relaying, the distortion added in the described manner at each relay point may become cumulative. Consequently, at times when such a detection-remodulation system is employed and a chain of relay stations is utilized, the signal output at the final stage may become considerably distorted with respect to the signal provided in the initial modulation source at the first stage.

Systems which use the detection-remodulation process, as distinguished from the heterodyne system, have the advantage of considerable simplicity with respect to equipment required at the relay stage. Usually it is possible to use substantially standard frequency modulation receivers and arrange them to add substantially standard types of frequency modulation transmitters.

In the heterodyne system it is essential to provide a special type of relay receiver which must be especially designed and arranged to feed the power amplifier of the frequency modulation transmitter. This tends to make the system complex.

The present invention, however, is based upon a principle of inverse feedback. Consequently, the quality of repeater action obtained in the heterodyne detection and remodulation method herein to be disclosed closely approximates that of the above described heterodyne system. Application of the inverse feedback principle, however, is different from the usual methods used for inverse feedback application, either to frequency modulation or amplitude modulation transmitters.

With the invention herein to be described the receiver signals and also the relayed signals are caused to heterodyne each other to a frequency equal to the difference frequency between them. Where there is a proper adjustment of the modulation of the retransmitted or relayed signal the difference frequency between the received and the relayed or retransmitted signal will be unmodulated. This comes about because the received and the relayed signals are deviated in the same proportion and by the same amount, with the result that the difference frequency is a constant.

The difference frequency, however, will be modulated by an amount equal to the difference in the degree of modulation between the received and the relayed signals where there is a difference in the modulations. Such a difference will include whatever distortion happens to be introduced in the relay operation, as well as the difference in degrees of modulation of the received and the relayed or retransmitted signals. Inverse feedback control of the modulation of the relayed or retransmitted signals will provide for a reduction in the distortion in the relayed or retransmitted signal and also will apply an inverse feedback action which will tend to equalize the degree of deviation on the received and relayed or retransmitted signal.

With this general type of apparatus it becomes an object of this invention to provide a radio relay in which received signal modulations of a suitable carrier frequency may be relayed or reradiated without introducing any appreciable or objectionable distortion in the re-radiated or retransmitted signal.

A further object of the invention is to provide a substantially distortion-free radio relay for retransmitting frequency modulations of a received carrier frequency where the apparatus for bringing about the relaying or retransmitting action is of a relatively simple nature and yet includes sufficient components to insure substantial freedom from distortion which otherwise might be introduced.

Other objects of the invention are those of providing improved relay operations, particularly applicable to FM networking operations where the control of the relaying operation or the retransmission is substantially stabilized with the result that manual controls of the operation become generally unnecessary.

The invention has been shown schematically in one of its preferred forms by the accompanying drawing, wherein the significant elements connecting the receiving antenna and the relay antenna are depicted and the frequency values indicated are purely for illustration of operation.

Referring now to the drawing, incoming frequency modulation signals occurring on any selected carrier frequency may be received on a relay directive antenna unit conventionally represented at 11. The received signals are then supplied to a relay FM receiver, conventionally represented at 13. The receiver is of substantially the standard form used in the now-installed FM relay operations at various locations. Signal output from the receiver 13 will represent a detected output of the signal modulation directed to the antenna 11. This signal output is supplied to mixing panel 15. The output of mixing panel 15 feeds FM transmitter 19 which may comprise the usual components of an FM transmitter such as a carrier source, frequency modulator, frequency multiplier and power amplifier. Transmitter 19 radiates its wave on transmitting antenna 21 at a frequency, $F_1$.

The antenna 11 for receiving the incoming signal is usually of the relay directive type for receiving signals of relatively weak intensity. The transmitting antenna from which the signal is relayed or retransmitted may be either a broadcast antenna or a directive antenna, depending, of course, upon the nature of the relay system utilized. For purposes of consideration of this invention, and for the purpose of understanding it still further, it may be assumed illustratively that the incoming signals appear as frequency modulations of a carrier frequency F, which may be assumed as being 100 megacycles. The relayed or retransmitted signals sent out from the antenna 21 will be assumed to occur as frequency modulations of a second frequency $F_1$. Illustratively this second frequency may be 101 megacycles. These values will be referred to at a later point in this description for describing still further the nature of the operation, but are purely illustrative.

The mixing panel 15 is for the purpose of mixing not only the detected output from the relay FM receiver, conventionally represented at 13, but also the output from the inverse feedback receiver unit conventionally represented as a whole by the numeral 23. As was above pointed out, the inverse feedback receiver develops voltages which are indicative of frequency differences or difference in degrees of modulation between the received and the relayed or retransmitted signals. Control of the relay signals effective at the modulation or mixing unit 15 may be provided by way of the conventionally represented control circuits shown as operating under the control of the knobs 25 and 27. These knobs may be assumed to control any suitable form of mixing unit, such as by providing suitable control of the signal amplitude effective at the control or screen grid of an appropriate mixing tube of well known character.

Further, the mixing and modulation unit 15 may incorporate appropriate types of coupling tubes, or, still further, any other conventional method by which the two audio frequency signals may be appropriately mixed to serve as the modulation or control source for any desired purpose.

Reference may now be made to the inverse feedback circuit 23. There is supplied to this circuit by way of the input conductors 29 and the input transformer 31 both those signal frequencies representing signals received from a remote point by the relay directive antenna 11, which signals were assumed to occur at the frequency F, and those signals for relay or retransmission which are available at the antenna 21 and which were assumed hereinbefore as being developed at the frequency $F_1$. The secondary circuit of the transformer 31 may be considered to be tuned by any convenient means, such as the capacitor 33. In this tuned circuit each of the frequencies F, as received, and $F_1$, as relayed or retransmitted, become available. If it be assumed that the received signals F occur at a frequency of 100 megacycles and the relayed or retransmitted signals $F_1$ occur at a frequency 101 megacycles, it becomes apparent that from the tuned circuit comprising a secondary of transformer 31 and its tuning condenser 33 there will be available relatively strong signal energy at the relaying or retransmitting frequency $F_1$ and a weaker signal at the receiver frequency F. These signals may be applied upon the control grid 35 of the tube 37. The combination of the two signals in this tube, which is preferably adjusted for converter operation, produces a heterodyne action. The output signals are modulations of a difference frequency which may be termed $F_2$. This frequency of oscillation is representative of the difference between frequencies $F_1$ and F. According to the assumed example, this output would occur at a frequency of 1 megacycle, with the result that the tuned output circuit 39 will be assumed to be tuned to a value of 1 megacycle for the illustrated operation.

Tuning of the circuit 39 is provided either by means of a variable inductance element 41 or by an adjustable iron core (solid or comminuted) tuner (not shown) associated therewith, or by means of the variable capacitor 43 or any other suitable arrangement. Cathode bias is provided on the tube 37 by the well known form of cathode resistor 45 and the shunt capacitor 47. Plate operating voltage is available at the terminal 49 to which the positive pole of a suitable plate supply is connected.

Output signals from the converter are then fed by way of the capacitor 51 to a control electrode 53 of a further frequency converter tube 55. Oscillations developed at a third frequency, which may be assumed to be $F_3$, and for illustrative purposes considered as being 11.7 megacycles, may be developed by any appropriate form of oscillator such as that conventionally shown at 57. The oscillator per se forms no part of this invention, and therefore it may be stated that any form of stabilized frequency source may be relied upon. Signals of the frequency $F_3$ may then be supplied to a further control electrode 59 of the converter tube 55. The resultant output signals available from the output of the tube 55 will represent the difference frequency between the oscillator 57 and the output signals from the converter tube 37 (that is, $F_3—F_2$, assumed equal to $F_4$). In the illustrated example, this would represent a frequency of 11.7 megacycles—1.0, or an output of 10.7 megacycles, to which the tuned circuit 61 connected with the output of the tube 55 is tuned.

This circuit is generally similar to that shown at 39 for the tube 37. Tuning is provided either by an adjustable inductance 63 or through the use of an iron core consisting of either the solid or comminuted variety (not shown), or the tuning capacitor conventionally represented at 65. Plate voltage for the tube may be supplied at the terminal 67 as indicated.

While it has been suggested that the oscillator 57 assumed to be tuned to the frequency $F_3$ is tuned to a frequency of 11.7 megacycles, it is clear that this may be tunable to various frequencies so as to accommodate signals of various frequency differences within the system. If, for instance, the difference frequency between the relay or retransmission frequency radiated from the antenna 21 and the incoming frequency available at the antenna 11 were 2.0 megacycles instead of the assumed 1.0 megacycle, it might be desirable, for instance, to have the oscillator 57 tuned to a frequency of 12.7 megacycles if the remaining parts of the system herein to be described as illustrative of one form of operation were to be left unchanged.

The output from the converter 55 is supplied through a coupling capacitor 64 to a frequency modulation receiver conventionally represented at 71. The receiver 71 may be considered as including suitable intermediate frequency selection circuits so arranged that the receiver as a whole selects, limits and detects the frequency modulation on the difference frequency $F_2$ representing the output of the converter 37. Under these circumstances, the assumed frequency $F_4$ representing the difference frequency between that of oscillator 57 and the output frequency of the converter 37 represents the intermediate frequency input of the receiver 71. If now the output from the relay or retransmitter sent out from the same antenna 21 were an exact reproduction of the signal received as the incoming signal available at the antenna 11 with respect to frequency deviation, there would, under these conditions, be no output at all available from the receiver unit 71, because there would be no frequency change represented by the output from the converter 37. However, where there is a lack of precise identity between the relayed or retransmitted signal sent out from the antenna 21 and the signal available at the receiving antenna 11, it is apparent that an output voltage will be available from the receiver 71 as there was from the output of the converter 37. This signal, however, will be one of amplified intensity as compared to the signal available at the output of the converter 37. The signal, however, will correspond to the difference in frequency deviation of the received and the reradiated signals. Accordingly, to effect a control of the retransmission, the output from the receiver 71 is connected to the modulation unit 15 by the indicated conductors and the signal there effective may be varied by a control of the knob 27, for instance. Under these circumstances, the receiver 71 applies a signal to the mixing panel in such a way that if the reradiated signal has a deviation which is less than that of the received signal, the receiver 71 will supply a modulation input which combines with the signal output from the receiver 13 in a manner to increase the deviation of the transmitter 19 and the signal transmitted from the antenna 21. For conditions when the deviation of the transmitter is higher than that of the incoming signal, the receiver 71 will apply a signal to the mixing panel modulation unit 15 of such polarity as partially to cancel the modulation applied from the received one. This provides a stabilization which maintains the output deviation of the transmitter 19 at substantially the same precise value as that of the incoming signal. Further distortions which appear on the outgoing signal and which are introduced by the relay process itself are cancelled.

It will be apparent that while the heterodyne step involving the use of the converter 55 and the oscillator 57 has been illustrated as a part of the drawing, nonetheless the output from the converter 37 might be fed directly to the receiver 71 on conditions where the receiver were provided with an intermediate frequency corresponding to that existing between the signals received at the antenna 11 and those transmitted from the antenna 21. For instance, this difference frequency between the signals retransmitted at the antenna 21 and those received at the antenna 11 happen to be those at the assumed 10.7 megacycles which was illustratively suggested as the frequency to which the intermediate frequency of the receiver 71 would be tuned, then the tuned circuit 39 in the output of the converter 37 could be tuned to the assumed 10.7 megacycles and fed directly to the intermediate frequency input of the receiver unit 71, with the resultant omission of the oscillator 57, the converter 55 and the tuned circuit 61, together with such other component parts as have been suggested. While this form of operation is possible, it nonetheless is to be pointed out that the system so modified would, in some respects, lack some of the flexibility of the heterodyne system, herein illustratively described. However, for the purpose of understanding this invention it is important to note that the control voltage which is developed at the output of he converter 37 is a measure of the departure between the output modulation at the antenna 21 and the received modulation at the antenna 11. Therefore this voltage is the controlling voltage which is effectively to provide the inverse feedback essential to establish the signal identity.

Having now described the invention, what is claimed is:

1. A radio relay comprising a pair of electrical paths, a receiver connected in one of the paths for receiving signal modulations occurring at one selected carrier frequency, a transmitter having means associated therewith for generating a carrier frequency different from that received, modulator means for modulating the locally generated carrier frequency under the control of the received signal modulations for retransmitting the signals, a heterodyne detector connected in another of said paths to receive the signal modulation of each carrier frequency to develop a voltage indicative of differences between the signal modulation on each carrier frequency, and a mixer circuit connected in common with the paths and responsive to the developed voltage for inversely controlling signal modulation of the locally generated carrier frequency to provide substantially precise coincidence between the signal modulations received and retransmitted.

2. Signal relaying apparatus comprising a signal transfer path, means in said path for receiving signals as frequency modulations of one selected carrier frequency, means for locally generating a second carrier frequency, means for frequency modulating the second carrier frequency under the control of the received signal modulations, means for transmitting the modulated second carrier frequency, a signal control path, means in said control path for concomitantly detecting the signal modulations at each of the received and the transmitted carrier frequencies to develop a control voltage proportional to differences in signal modulation of each of the said carrier frequencies, and a control circuit in common with said paths for inversely controlling the signal modulation of the second carrier by the developed control voltages to establish substantially precise coincidence between each of the signal modulations.

3. A radio relay for relaying frequency modulated signals comprising a signal transfer path, a first receiver connected in said path to receive and respond to the frequency modulation signals occurring on one selected carrier frequency, a transmitter for developing carrier frequency energy at a frequency different from that of the carrier frequency received, a modulator for modulating the developed transmitter carrier frequency under the control of the received modulation frequencies, a signal control path, a second receiver connected in the control path to receive each of the modulated carrier frequency signals, a heterodyne detector forming a part of the second receiver and connected to respond to each of the modulated carrier frequencies to develop a voltage output indicative of differences between the signal modulation of each carrier frequency, and a mixing circuit connected in common with the paths to respond to the developed voltage to control supplementarily the modulation of the developed carrier frequency by received signals so as to provide substantially precise coincidence between the signal modulation of the developed carrier frequency and the received signal modulation.

4. A radio relay comprising a first receiver for receiving and responding to signal modulations transmitted as frequency modulations of one selected carrier frequency, means for locally generating a transmission carrier frequency at a frequency different from that received, a signal modulator for modulating the transmission carrier frequency under the control of the signal output of the receiver, a second signal receiver connected to receive the signal modulation at each of the carrier frequencies, a heterodyne detector to develop signal voltage indicative of frequency differences between signal modulation on each carrier frequency, a local oscillator connected to develop oscillations at a frequency which is different from that of the one selected carrier and transmission carrier, a frequency converter connected to receive both the locally developed oscillations and the developed voltages indicative of differences in modulation between the received and transmission carrier frequencies, means for amplifying and detecting the converted signal output for producing a modulation control voltage, and means for varying the signals supplied to the modulator for modulation of the transmission carrier by the developed voltage for supplementarily controlling the transmission signals during periods of lack of modulation coincidence between the transmission and received carriers.

5. For use in combination with a frequency modulation relay station adapted to receive a first carrier modulated by signal energy and to transmit substantially said signal energy at a higher level on a second carrier which includes at least a receiver responsive to the first carrier to obtain therefrom signal modulation and a transmitter for relaying the signal modulation on the second carrier, the combination comprising a heterodyne circuit responsive to the first and second modulated carriers to provide the difference frequency therebetween in the form of a third carrier modulated by a control voltage representative of differences in the respective signal modulations, a further receiver tuned to one selected frequency, a local oscillator adapted to supply a wave having a frequency differing from the third carrier by said one selected frequency, a frequency converter to receive the modulated third carrier and the oscillator wave to provide as an output said one selected frequency modulated by the control voltage, connections for introducing the modulated one selected frequency into said further receiver whereby the control voltage is separated from the one selected frequency, and means for mixing the signal modulations from the first mentioned receiver and the control voltage from the further receiver to provide signal energy substantially in coincidence with signal energy of the first carrier for modulating the second carrier.

References Cited in the file of this patent

UNITED STATES PATENTS

| Number | Name | Date |
|---|---|---|
| 2,114,036 | Smith et al. | Apr. 12, 1938 |
| 2,148,532 | Chaffee | Feb. 28, 1939 |
| 2,369,663 | Dennis et al. | Feb. 20, 1945 |
| 2,396,884 | Robinson | Mar. 19, 1946 |
| 2,407,212 | Tunick | Sept. 3, 1946 |
| 2,469,218 | Thomas | May 3, 1949 |
| 2,582,668 | Bailey | Jan. 15, 1952 |